Figure 1:
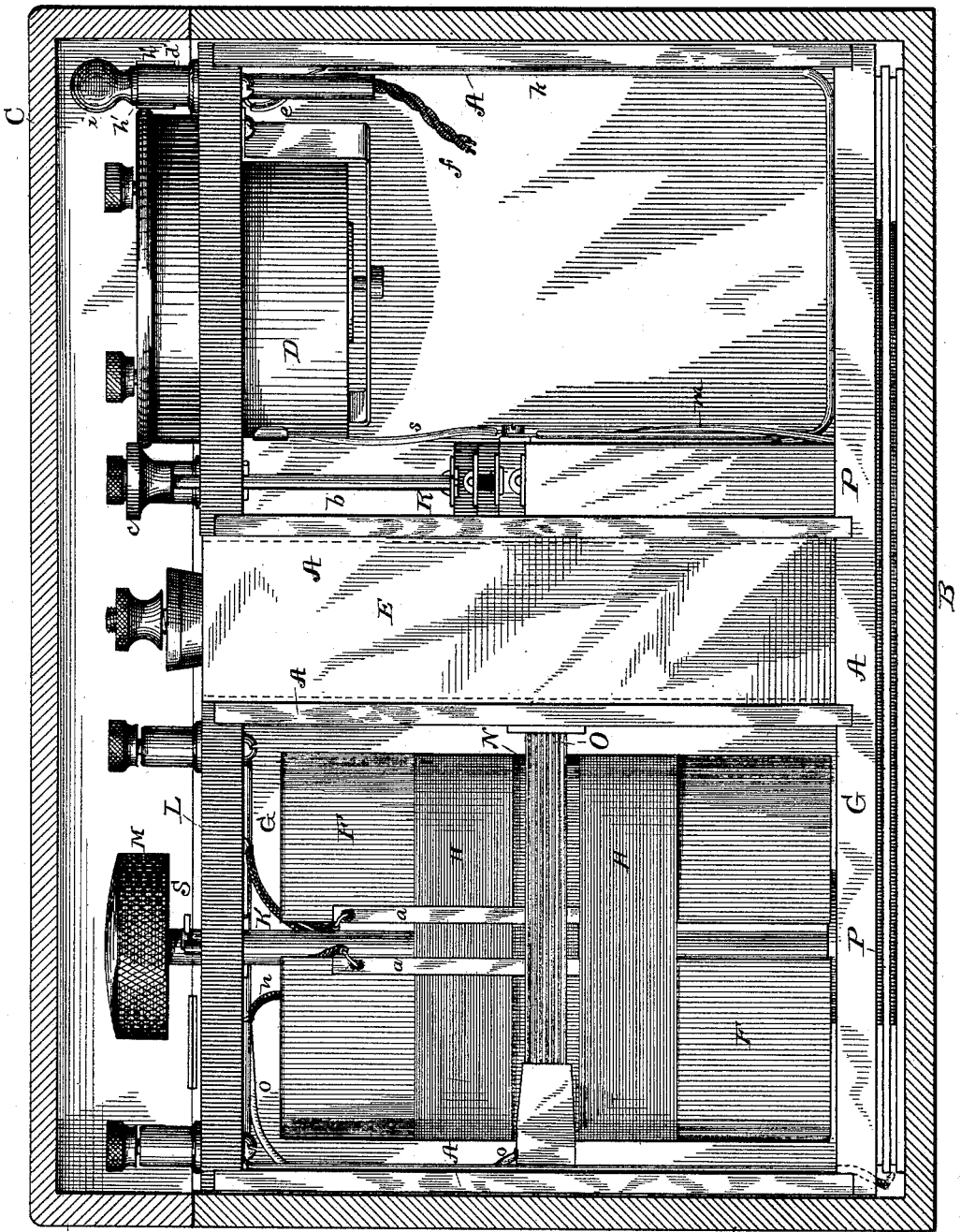

(No Model.)  3 Sheets—Sheet 1.

C. WIRT.
ELECTRICAL INDICATOR.

No. 448,792.  Patented Mar. 24, 1891.

(No Model.) 3 Sheets—Sheet 2.
C. WIRT.
ELECTRICAL INDICATOR.
No. 448,792. Patented Mar. 24, 1891.
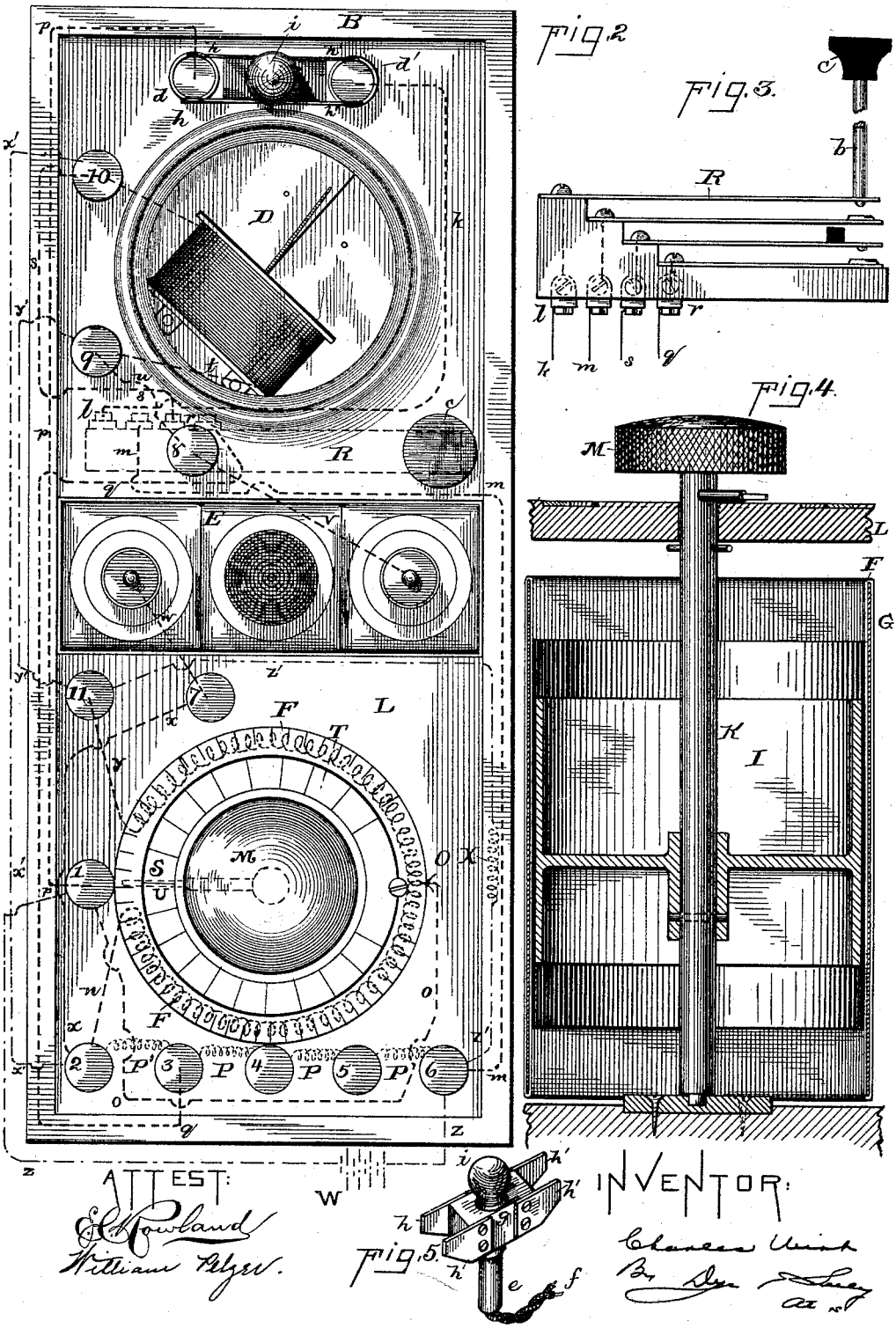

(No Model.)
3 Sheets—Sheet 3.
C. WIRT.
ELECTRICAL INDICATOR.
No. 448,792. Patented Mar. 24, 1891.
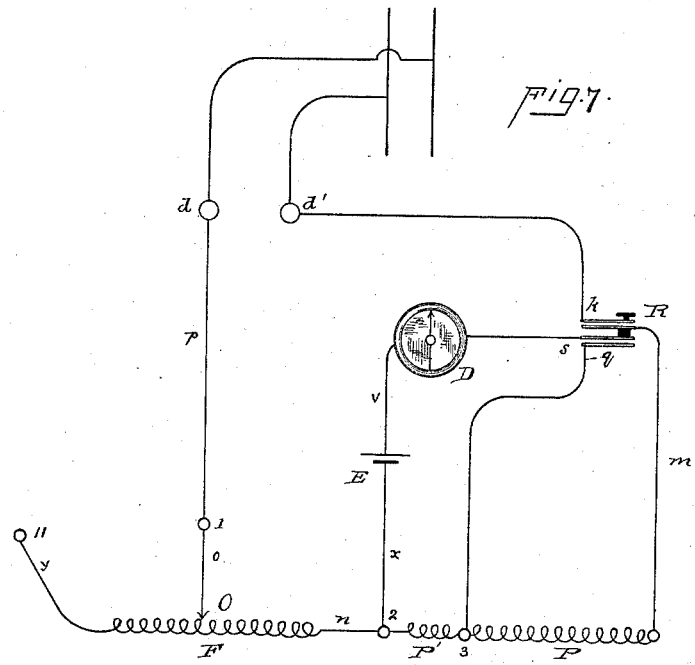
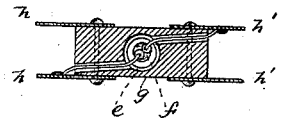
Witnesses
Inventor
Charles Wirt
By his Attorneys

UNITED STATES PATENT OFFICE.

CHARLES WIRT, OF NEW YORK, N. Y.

ELECTRICAL INDICATOR.

SPECIFICATION forming part of Letters Patent No. 448,792, dated March 24, 1891.

Application filed May 2, 1887. Serial No. 236,825. (No model.)

*To all whom it may concern:*

Be it known that I, CHARLES WIRT, of New York city, in the county and State of New York, have invented a certain new and useful Improvement in Electrical Indicators, of which the following is a specification.

My invention relates to certain improvements on the electrical indicator shown and described in my patent, No. 345,755, dated July 20, 1886.

The principal feature of improvement is in the arrangement and construction of the rheostat or adjustable resistance employed in such indicator, and my improved rheostat is adapted for use also in other situations. Other features of improvement are in the arrangement of the fixed resistance-coils, the arrangement of the circuits and binding-posts, whereby the indicator is adapted to be used as a Wheatstone bridge in addition to its ordinary uses, in the connecting device for connecting the instrument in circuit, and in other details of construction and arrangement, whereby the efficiency, convenience, and simplicity of the instrument are increased.

My invention is illustrated in the annexed drawings, in which—

Figure 1 is a side elevation of the instrument with its inclosing box or case in section; Fig. 2, a plan view of the instrument with its electrical connections in diagram; Fig. 3, a side elevation of the circuit making and breaking key; Fig. 4, a vertical section of the rheostat; Fig. 5, a perspective view of the connecting device; Fig. 6, a cross-section thereof, and Fig. 7 a simple diagram of the normal connections.

All the parts of the instrument are held in or by a wooden frame A A, set removably in a box B, provided with a hinged cover C, whereby the instrument may be readily carried from place to place.

As in my patent above referred to, the indicating-instrument consists, generally, of a series of resistance-coils adapted to be connected across the circuit whose electro-motive force is to be measured or indicated, a shunt around a certain fixed part of such resistance, a constant standard battery, a galvanometer and a key in said shunt, and means for varying the amount of resistance in circuit outside the terminals of the shunt, by doing which the electro-motive force of the current is varied until it equals that of the standard battery and the galvanometer comes to zero, and so by noting the amount of variation of the resistance which has been necessary to bring the electro-motive force to that of the battery the electro-motive force on the line is determined.

D is the galvanometer, supported at one end of the frame A and provided with sliding electrical connections on its lower side, as in the patent referred to, whereby the position of the galvanometer may be readily adjusted.

At the middle of the instrument, between the two parts of the frame A and resting on the bottom of the frame, is the standard constant battery E, preferably consisting of three connected bottles with the active elements in the outer ones, as set forth in my patent, No. 345,756, dated July 20, 1886.

At the other end of the frame are placed the variable-resistance coils illustrated in Figs. 1 and 4 and diagrammatically indicated in Figs. 2 and 7. These are coils F, of fine insulated wire, wound longitudinally upon the walls of a drum or hollow cylinder G. I prefer to form this wire-wound drum by taking a sheet of flexible pasteboard and winding the same with the insulated fine wire, and then bending the sheet into a cylinder and securing it by thread or insulated wire H, wound around the drum transversely, to the resistance-coils, the coils being also preferably covered with varnish to hold them in place and improve their insulation. I place this drum upon a metal hub I, Fig. 4, secured to the spindle K, which spindle is stepped at its lower end in the frame A, and at its upper end passes through a plate L of hard rubber and terminates in a turning knob M. The ends of the continuous series of coils F terminate in metal strips *a a*. The coils are bared of insulation at the part N, the bared portion extending entirely around the cylinder.

Extending across the frame A, so as to bear upon the bared part of the rheostat-coils, is a spring consisting of several parallel stiff wires O, secured to the frame at their ends, so as to make a good contact with the wires F as they turn under it.

The fixed or unvaried part of the resistance-coils of the instrument, around a part of which the battery-shunt is taken, are shown at P P'. They are wound upon flat sheets of pasteboard or thin wood and are secured, as shown, upon the under side of frame A.

At the end of the frame which carries the galvanometer is placed the key R. This is a double key for making and breaking one circuit in advance of the other, and is such as is set forth in my patent, No. 315,755, already referred to. A long stem b extends from the key up through the top of the frame, terminating in the operating-knob c, whereby the key is operated from the top of the instrument, though it is itself out of sight and protected from injury.

The line connections are made to the instrument at the binding-posts d d'. Connections may be made here in any ordinary manner. I prefer, however, to use the connecting device shown, which consists of a hollow insulating-stem e, entered by the flexible cord f. From the enlarged part g of the stem there extend on one side two flat metal springs h h and on the other side two similar springs h' h'. The stem terminates in a handle i. The wires are brought through the body, as shown, and connected one to a spring on one side, the other to one on the other side, the springs on the same side being joined together by the screws or rivets. It is placed upon the binding-posts, as shown in Figs. 1 and 2, the posts entering between the springs on each side, whereby good contact is made. I prefer to provide binding-posts of ordinary construction, as shown, for making this connection, because it may sometimes be desirable to make other connections to the instrument for other purposes; but it is evident that this form of connecting device may be used with any kind of metal posts, stems, or plates adapted to enter between the springs.

The electrical connections are indicated in Fig. 2, the heavy broken lines showing the regular or permanent connections and the lighter ones the extra connections employed when the instrument is used for a Wheatstone bridge.

Fig. 7 is a simpler diagram showing the regular or normal connections generally, but with some of the binding-posts and wires omitted, the diagram being intended merely to illustrate the principle of the invention.

At the posts d d', by means of the connecting device and the flexible cord, the instrument is connected across the circuit or between the two points the electro-motive force or difference of potential between which it is desired to measure or indicate. The circuits through the instrument are then as follows: from post d' by wire k to terminal l of the key R, (see Fig. 3,) through the two top springs of the key (where normally this circuit, which is the resistance-circuit, is broken) to wire m, thence to binding-post 6, through all the fixed resistances P to post 3 and P' to post 2, wire n to adjustable resistance-coils F, through such of these coils as are in circuit to contact-spring O, (illustrated in diagram in Fig. 2,) by wire o to binding-post 1, and thence by wire p to terminal post d. The resistance is thus connected across the line. The shunt is around the portion P' of the resistance. It is from binding-post 3 by wire q to terminal r of double key R, through the two lower springs of the key, where the shunt is normally open, wire s to binding-post 10, to galvanometer-coils, by wire t to post 9, by wire u to post 8, wire v to battery, wire w to post 7, and wire x to post 2, whereby the shunt is made through battery, galvanometer, and key around resistance P'. All these connections are made, as will be readily understood, by insulated wires suitably held by the frame A, some of which wires appear in Fig. 1. The connections to the turning resistance-drum are made, preferably, by flexible conductors which permit a revolution of the drum, stops being provided to prevent the drum from being turned continuously in the same direction.

A graduated circular scale T is placed on the plate L, and the spindle K is provided with a pointer U, traveling over said scale.

The operation is as follows: Connection with the circuit having been made as described, the galvanometer is first turned so as to bring its pointer to zero. Then the key is depressed and closes, first, the resistance-circuit and then the shunt, so that the current to be indicated and the known battery-current are opposed in the shunt. If the electro-motive force of one is more than that of the other, the galvanometer-needle is deflected in one direction or the other. Then by turning the drum G portions of the resistance-coils F are cut out of circuit, and the initial electro-motive force is thereby varied until the needle returns again to zero, whereupon the electro-motive force of the circuit under consideration is known, being denoted by the amount of change in the resistance in circuit. The scale T is preferably graduated in volts, so that the electro-motive force may be read directly therefrom. If when the key is first closed the galvanometer is violently deflected, it indicates that the two currents are in the same direction. The connecting device is then withdrawn from the posts d d' and turned around so that the line connection is reversed.

The arrangement of the rheostat with the variable coils wound longitudinally on a drum turning under a stationary contact is a very simple and efficient arrangement for an adjustable resistance not only for this instrument, but for other purposes. It does away with the series of contact-plates and pivoted arm which have hitherto been necessary in adjustable resistances and brings the apparatus into compact shape and makes it more conveniently operative.

My arrangement of binding posts and connections, especially the connection by wire y from coils F to binding-post 11, which connection has no function in the ordinary use of the instrument, adapts the instrument to be used also as a Wheatstone bridge for measuring resistances. Additional connections may be made for this purpose as follows: A battery W is connected to the instrument by wire $z$ between binding-posts 1 and 6. From 6 a connection $z'$ is carried to binding-post 11, in which portion of the circuit the resistance X to be measured is placed. From 11 wire $y'$ runs to galvanometer-terminal 9, and from the other galvanometer-terminal 10 a wire $x'$ goes to binding-post 2, which is connected by wire $n$ with one end of coils F, the other end of said coils being, as just stated, connected by $y$ with 11. This makes coils F two sides of the bridge, with their relation variable by the movement relative to them of contact O, while coils P and unknown resistance X form the other two sides, and the galvanometer is connected across from between X and one end of F to between P P' and the other end of F, and the bridge is operated in the ordinary manner.

What I claim is—

1. In an adjustable resistance, the combination of a turning drum or cylinder, wire coils wound longitudinally thereon, bared for a portion of their length, transverse windings at the side of said bared portion to hold the coils in place, and a stationary contact bearing on the bared section of said coils, substantially as set forth.

2. In an adjustable resistance, the combination of a supporting-frame, a drum or cylinder turning in bearings in said frame and having resistance-coils wound upon it and bared for a portion of their length, and a contact-spring extending from one side of the frame to the other and bearing on said bared portion, substantially as set forth.

3. In an adjustable resistance for electrical indicators, the combination of a turning spindle, a drum or cylinder carried thereby and carrying resistance-coils, a stationary contact bearing on said coils at a point where the insulation is removed, a graduated scale, and a pointer on said spindle traveling over said scale, substantially as set forth.

4. In an electrical indicator, the combination of the frame supporting the adjustable resistance and the flat resistance-coils secured to the bottom of said frame and constituting a fixed resistance co-operating with the adjustable resistance in said indicator, substantially as set forth.

5. The connecting device comprising a hollow insulating-stem for receiving conductors and two springs projecting from each side of said stem, each conductor being connected to the two springs on one side, substantially as set forth.

This specification signed and witnessed this 27th day of April, 1887.

CHARLES WIRT.

Witnesses:
GIACOMO SCHMIDT,
L. C. T. WADE.